United States Patent [19]

Fachbach et al.

[11] 4,203,407

[45] May 20, 1980

[54] INTERNAL COMBUSTION ENGINE WITH A SOUND-REDUCING ENCAPSULATION

[75] Inventors: Heinz Fachbach; Gerhard Thien; Karl Kirchweger, all of Graz, Austria

[73] Assignee: Hans List, Graz, Austria

[21] Appl. No.: 933,606

[22] Filed: Aug. 14, 1978

[30] Foreign Application Priority Data

Aug. 18, 1977 [AT] Austria .................................. 5989/77

[51] Int. Cl.² .......................................... F02B 77/00
[52] U.S. Cl. ............................... 123/198 E; 123/41.7; 181/204
[58] Field of Search ............ 123/198 E, 195 C, 195 S, 123/41.7; 181/204, 227, 228, 240; 180/54 A, 69.1

[56] References Cited

U.S. PATENT DOCUMENTS

| Re. 29,923 | 3/1979 | Thien et al. | 181/204 |
|---|---|---|---|
| 3,684,053 | 8/1972 | Fachbach et al. | 123/198 E |
| 3,951,114 | 4/1976 | Fachbach et al. | 123/198 E |
| 4,011,849 | 3/1977 | Latham | 123/198 E |
| 4,149,512 | 4/1979 | Hatz | 123/198 E |

*Primary Examiner*—Ira S. Lazarus
*Attorney, Agent, or Firm*—Watson, Cole, Grindle & Watson

[57] ABSTRACT

An internal combustion engine with a sound-reducing encapsulation, wherein at least the hottest parts of the exhaust system of the engine are located outside of the engine encapsulation and within a special exhaust pipe casing. At the upper side of the exhaust pipe casing an air outlet opening is provided through which the air heated by the exhaust system parts can emerge to the surroundings without getting into the encapsulation. The air outlet opening is lined with sound-absorbing material. The free sectional area of the air outlet opening preferably may be variable by flap means and in dependency of an engine operation parameter. The flap means can be operated by a hydraulic cylinder connected to the lubricating system of the engine.

5 Claims, 7 Drawing Figures

INTERNAL COMBUSTION ENGINE WITH A SOUND-REDUCING ENCAPSULATION

BACKGROUND OF THE INVENTION

This invention relates to an internal combustion engine with a sound-reducing encapsulation, at the encapsulation being provided at least each one air inlet and one air outlet opening, a blower being arranged between the openings for ventilation of the interspace between the engine and the encapsulation, an exhaust system being connected to the engine consisting at least of an exhaust manifold and further exhaust pipe work both being arranged outside of the engine encapsulation, and an exhaust pipe casing being joined to the encapsulation, said casing having air outlet openings at its upper side.

DESCRIPTION OF THE PRIOR ART

At a known engine of this type a part of the exhaust system, that is an exhaust silencer and a part of the exhaust tail pipe, is located outside of the engine encapsulation and within a special sound-suppressing casing. Ventilation of the engine encapsulation is made by means of the engine's cooling blower which draws air over an air inlet opening provided in the encapsulation. This air is blown through the interspace between the engine surface and the encapsulation and discharged to the surroundings over air outlet openings in the lower range of the encapsulation. The hottest part of the exhaust system, that is the exhaust manifold with its connection branches, is located within the engine encapsulation. The cooling blower which simultaneously ventilates the encapsulation has to be dimensioned stronger to overcome the excessive heat radiation of the exhaust manifold. Therefore the blower needs not only more power input but it also represents an important source of noise emission. At the upper side of the exhaust pipe casing which contains the mentioned exhaust silencer an opening is provided through which heated air may escape from the exhaust pipe casing.

At this known engine the whole exhaust system is rigidly connected to the engine. Therefore the large surface exhaust silencer is loaded with body resonance and thus represents an eminent source for noise radiation. Due to the high heat radiation of the silencer the air outlet opening at the upper side of the exhaust pipe casing has to be relatively large to enable sufficient escape of heated air. However, also noise transmitted by the exhaust silencer passes unimpededly through the air outlet opening and therefore deminishes the noise-suppressing effect gained by the engine encapsulation and the exhaust pipe casing respectively.

Also known is another encapsulated internal combustion engine at which a special blower for ventilation of the encapsulation is provided within the encapsulation. In this arrangement the ventilation air is divided into two partial streams by means of leading partitions within the encapsulation, one air stream flowing over the relatively little heated engine parts and the other flowing over the hot parts of the exhaust system. Both partial air streams pass through separated sidely outlet openings in the encapsulation to the surroundings. Disadvantageously, however, the hot parts of the exhaust system considerably heat the interior of the encapsulation when stopping the engine.

SUMMARY OF THE INVENTION

It is the aim of this invention to avoid the mentioned disadvantages of the known constructions and to propose a simple solution of the problem without impairing the noise-suppressing effect of the engine encapsulation. According to the invention this can be attained when at an engine of the type referred to at the beginning also the exhaust manifold of the engine and at least a part of each of the exhaust manifold connecting branches are also located outside of the engine encapsulation and enclosed by said exhaust pipe casing, at the exhaust pipe casing being provided an air discharge duct through which the exhaust pipe enclosedly penetrates, the exhaust manifold connecting branches forming in the range of penetration through the side wall of the engine encapsulation each an annular gap with said side wall, in the range of the air outlet opening at the upper side of the exhaust pipe casing being arranged means to prevent air-transmitted sound from escaping to the surroundings.

Since the invention provides a special ventilation blower for the engine encapsulation and since the exhaust system parts which are responsible for a particular strong heat radiation are removed from the engine encapsulation and located within a special exhaust pipe casing, the ventilation blower may be dimensioned substantially smaller than that of the known engine described first, therefore requiring less power input and causing lower noise-emission. The great heat radiation of the substantially totally within the exhaust pipe casing located exhaust system after stopping the engine is encountered by the air outlet opening arranged at the upper side of the exhaust pipe casing, in the range of which means are provided for preventing air-transmitted noise from escaping through said opening. In contrast to the at the beginning first-mentioned known engine, at the engine encapsulation according to the invention the air outlet opening at the upper side of the exhaust pipe casing may be chosen with a large free sectional area. This enables good cooling of the exhaust system parts lying within the exhaust pipe casing and, when stopping the engine, undesired re-entry of air heated by said hot exhaust system parts into the inside of the engine encapsulation is avvoided. The above mentioned means to prevent air-transmitted noise from escaping make possible efficient noise suppression during engine operation despite the large free sectional area of the heated air outlet. During engine operation the ventilation blower presses sufficient air through the annular gaps surrounding the exhaust manifold branches to cool the exhaust pipe lying within the air discharge duct. After stopping the engine the rising heated air emerges to the surroundings over the air outlet opening at the upper side of the exhaust pipe casing due to the low flow resistance through said opening, and no re-entry of heated air into the engine encapsulation through the annular gaps which offer a relatively high resistance to air flow occurs.

According to an especially simple and likewise efficient arrangement before the air outlet opening at the upper side of the exhaust pipe casing is arranged an air outlet duct having deflection means for the emerging air, such means being lined with sound absorbing material. Suitable layout of the deflection means, which represent a kind of labyrinth, enables determination of the amount of cooling air emerging during engine operation over the air discharge duct thereby cooling the exhaust pipe. Simultaneously th labyrinth, together with the sound absorbing lining, makes possible a very efficient suppression of air-transmitted noise.

According to a further embodiment of the invention the sectional area of the air outlet opening at the upper side of the exhaust pipe casing is variable. A preferred possibility to make the sectional area variable is that at the air outlet opening are arranged flap means controlled by an engine operation parameter whereby the flaps are held closed when the engine is running and turned open when the engine is stopped. Thereby it may be particularly advantageous to provide hydraulic cylinder means to control the flap means, the cylinder means being connected to the engine lubricating system.

DESCRIPTION OF THE DRAWINGS

The invention will be hereinafter more specifically explained with reference to two exemplary embodiments depicted in the accompanying drawings wherein.

DESCRIPTION OF THE PREFERRED EMBODIMENTS

Figure 1:
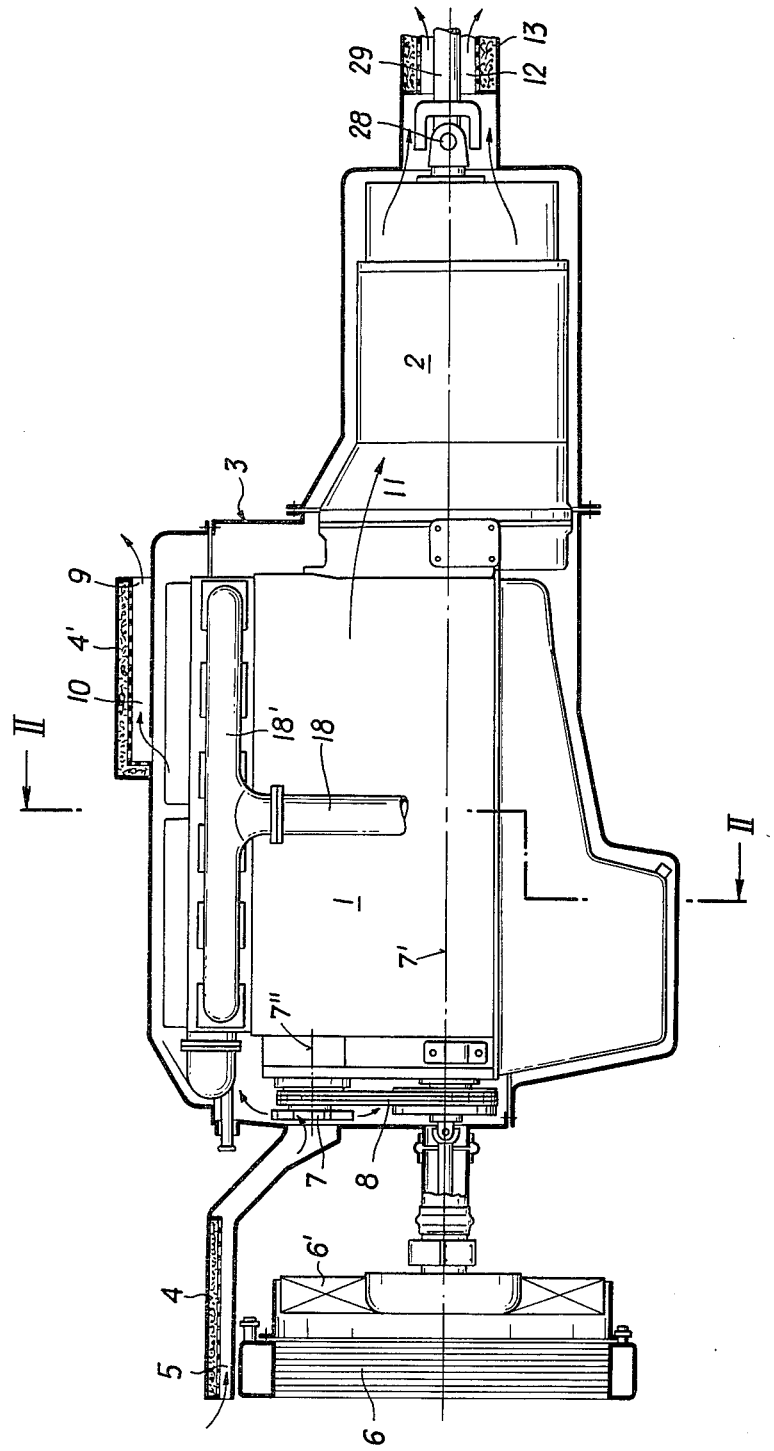
FIG. 1 shows an internal combustion engine according to the invention.

FIG. 1 schematically illustrates an internal combustion engine 1 to which a gearbox 2 is connected, and both being surrounded by a sound-suppressing encapsulation 3. Attachment of encapsulation 3 which is not essential for the invention is not shown. Encapsulation 3 is provided with an air inlet opening 5 lined with a sound absorbing material 4 and extending in the manner of a snorkel to a water cooler 6, so that no air heated by water cooler 6 and drawn by a fan 6' can get into air inlet opening 5. Within encapsulation 3 a blower 7 is arranged which gets drive from the crankshaft of engine 1 by means of a V-belt 8, th crankshaft being indicated by its axis 7'. The axis of blower 7 is designated by 7". Blower 7 draws air from air inlet opening 5 over engine 1, then one partial air stream 9 emerges to the surroundings through an air outlet opening 10 arranged on the upper side of engine encapsulation 3, opening 10 having a lining 4' of sound-absorbing material. A second partial air stream, indicated by arrows 11, flows over gear box 2 and emerges to the surroundings at opening 12 which is also provided with a lining 13 of sound-absorbing material. Output shaft 29 is connected to crankshaft 7' by means of cardan joint 28.

Figure 3:
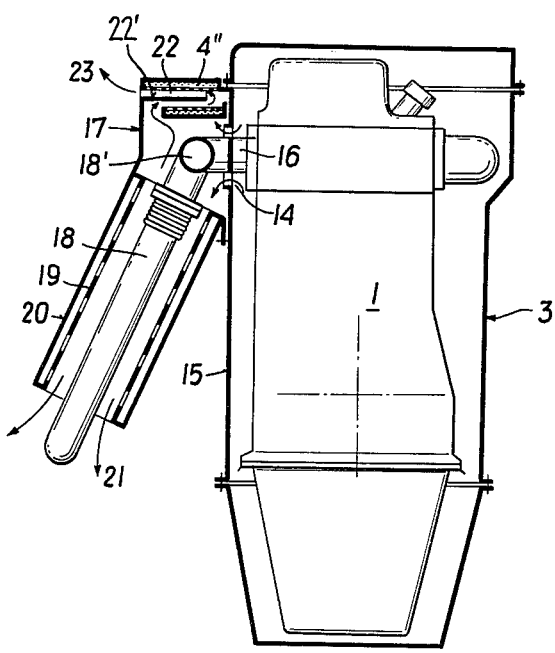
FIG. 3 shows the arrangement of FIG. 2 but with the engine in operation.

As shown in FIG. 3, during engine operation, a further part of the encapsulation ventilation air flows through annular gaps 14, formed between a side wall 15 of encapsulation 3 and exhaust manifold connecting branches 16, into an exhaust pipe casing 17. The main part of this partial air stream gets to an air discharge duct 20, as indicated by arrows 21, thereby cooling an exhaust pipe 18 which is located within duct 20. Air discharge duct 20 includes a silencer, 19. A smaller partial air stream, indicated by arrow 23, emerges to the surroundings through an air outlet duct 22 provided at the upper side of exhaust pipe casing 17. Air outlet duct 22 comprises a deflection means 22' which form a kind of labyrinth and have a sound-absorbing lining 4" (FIG. 3).

Figure 2:
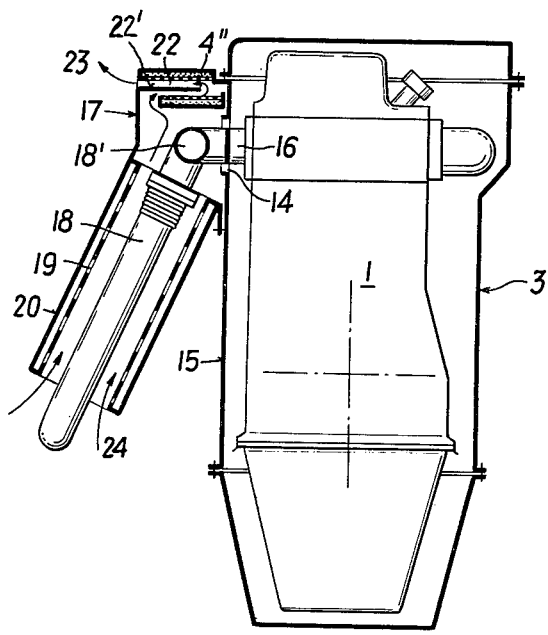
FIG. 2 is a cross section taken along line II—II of FIG. 1, the engine being stopped and warm.

As shown in FIG. 2, after stopping the engine, air is heated by hot exhaust pipe 18 and exhaust manifold 18' and rises within air discharge duct 20 as indicated by arrow 24. This rising heated air emerges to the surroundings through air outlet duct 22 without getting into the inside of encapsulation 3. After stopping the engine, therefore, overheating of encapsulation 3 and damage to the sealing elements of the encapsulation is avoided, and also danger of fire due to overheating is diminished. The embodiment of FIGS. 2 and 3 has no movable parts and is therefore quite simple. During engine operation good noise suppression is gained due to the lining of air outlet duct 22 with sound-absorbing material.

Figure 4:
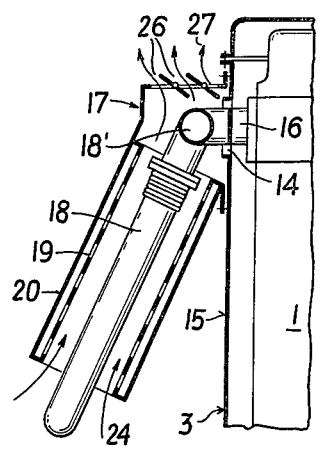
FIG. 4 is a partial cross section according to FIG. 2 of another embodiment.
Figure 5:
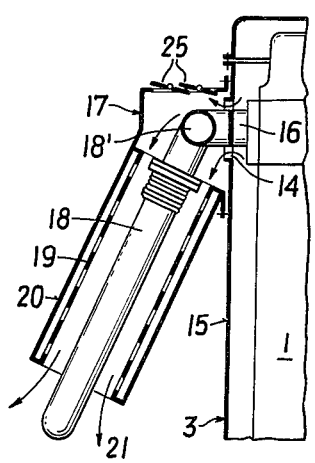
FIG. 5 shows the arrangement of FIG. 4 but with the engine in operation.

In the FIGS. 4 and 5 embodiment, like parts are given like reference numerals as in FIGS. 1 to 3. Flop means 25 are provided at the upper side of exhaust pipe casing 7. The flaps are closed during engine operation thus preventing air-transmitted noise from escaping. The whole cooling air flowing over annular gaps 14 into exhaust pipe casing 17 emerges through air discharge duct 20, as indicated by arrow 21 in FIG. 5, thereby cooling exhaust pipe 18.

After stopping the engine (FIG. 4) openings 26 are released by flap means 25 and heated air rising along exhaust pipe 18 (arrows 24) can emerge at the upside as indicated by arrows 27. Re-entry of heated air into encapsulation 3 is safely avoided also with this embodiment.

Figure 6:
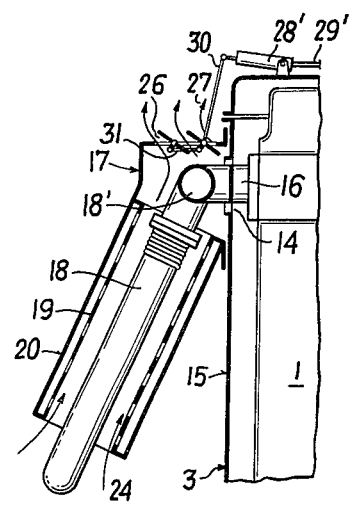
FIGS. 6 and 7 show a flap control device in the embodiment according to FIGS. 4 and 5.
Figure 7:
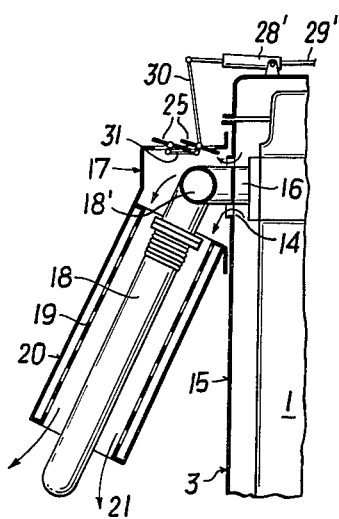

Flap means 25 may be controlled by hand or preferably by means of hydraulic working cylinder 28' which is connected to the engine lubricating system 29' and linkage rods 30, 31, as shown in FIG. 6. As long as lubricating system 29' is under pressure during engine operation flaps 25 are held in a closed position (FIG. 7). After stopping the engine lubricating pressure drops and flaps 25 are opened by means of cylinder 28' and linkage rods 30, 31.

We claim:

1. An internal combustion engine having a spaced sound-reducing encapsulation, at the encapsulation being provided at least each one air inlet and one air outlet opening, a blower arranged between said openings for ventilation of the interspace between the engine and the encapsulation, an exhaust system being connected to the engine comprising at least an exhaust manifold being arranged outwardly of the engine encapsulation and exhaust manifold connecting branches, and an exhaust pipe casing being joined to the encapsulation, said casing having air outlet openings at its upper side, at least a part of the exhaust manifold connecting branches also being located outwardly of the engine encapsulation and being enclosed by said exhaust pipe casing, at the exhaust pipe casing there being provided an air discharge duct through which the exhaust pipe extends, said exhaust manifold connecting branches forming in the range of penetration through the side wall of the engine encapsulation each an annular gap with said side wall, in the range of the air outlet openings at the upper side of the exhaust pipe casing there being arranged means to prevent air-transmitted sound from escaping to the surroundings.

2. An engine according to claim 1 wherein, adjacent the air outlet opening at the upper side of the exhaust pipe casing there being arranged an air outlet duct having deflection means for the emerging air, said means being lined with sound absorbing material.

3. An engine according to claim 1 wherein, the sectional area of the air outlet openings at the upper side of the exhaust pipe casing is variable.

4. An engine according to claim 3 wherein, at the air outlet openings are arranged flap means controlled by an engine operation parameter whereby the flaps are held closed when the engine is running and turned open when the engine is stopped.

5. An engine according to claim 4 wherein, hydraulic cylinder means are provided to control the flap means, said cylinder means being connected to the engine lubricating system.

* * * * *